Patented Dec. 10, 1940

2,224,228

UNITED STATES PATENT OFFICE 2,224,228

METHOD FOR THE PREVENTION OF FORMATION OF STABLE TAR EMULSIONS

Charles A. Lunn and Arthur R. Belyea, Norwalk, Conn., assignors to Consolidated Edison Company of New York, Inc., New York, N. Y., a corporation of New York No Drawing. Application August 7, 1937, Serial No. 157,976

5 Claims. (Cl. 252—330)

This invention relates to methods for preventing the formation of stable emulsions of water and tar during the production of carburetted water gas or other fuel gases by processes involving the thermal decomposition of hydrocarbon oils.

According to processes now commonly in use for the production of carburetted water gas, hot crude gases produced in the water gas machine are cooled by passage through a liquid seal, termed a wash box, and by condensers. In the wash box the gases bubble through a water seal which is maintained at the desired depth and temperature by circulating comparatively cool water therethrough. Some tar and water are condensed in the wash box and these condensates, together with circulating water, flow to separators for the separation of water from the tar emulsion; the water being recirculated to the wash boxes or discarded and the tar emulsion pumped to subsequent plant equipment for resolution. The partially purified gases then pass to condensers where by cooling and/or liquid scrubbing additional quantities of tar and water are condensed and removed; the condensates and liquid scrubbing medium, if employed, flowing to separators for separation of water from tar emulsion and the tar emulsion pumped to subsequent plant equipment for resolution.

The tar emulsions obtained in this manner are generally of the water-in-oil type, and are frequently very stable in character and entail considerable labor and materials costs in effecting the required degree of dehydration for disposal, and may seriously interfere with normal plant operation.

During the period of experimentation leading up to the present invention, samples of tar emulsions were examined microscopically, which examination indicated the dispersed water particles to be surrounded by a stabilizing film or shell which prevented coalescence and hence prevented separation of water from tar. Workers in the field of emulsions confirm the presence of such stabilizing shells and term them protective colloids, the mechanism of protection depending on the fact that particles of the dispersed phase adsorb on their surfaces, shells of the material of the protective colloid and are themselves rendered stable. It is also known that factors which govern stabilization of emulsions can be used to break them, hence any means which will remove this shell should break the emulsion. Working on the above premise, samples of emulsion were treated with a wide variety of wetting agents and chemicals tending to form emulsions of the oil-in-water as distinguished from the water-in-oil type. These were found to be generally successful in breaking water-in-tar emulsions, but only to the degree in which the added agent could be brought to bear on the stabilizing shell or protective colloid surrounding the dispersed water particles, which by available mechanical means was found to be outside practical limits. This led to the conception of utilizing these agents to prevent the initial formation of the stabilizing shell or protective colloid by having such agents present during the stage of condensation of the tar. Carburetted water gas processes utilize condensation methods for the removal of the major part of tar from gas. It was believed that by bringing the force of these wetting agents to bear at the point of condensation, the formation of water-in-tar emulsions could be prevented. The maintenance of controlled concentrations of suitable chemicals at points of condensation in plant operation has confirmed this theory.

The object of the present invention is to provide processes which through chemical control of condensation materially reduce or eliminate the problem of separation of water from tar and permit the plant operation to proceed without hindrance, delay or appreciable extra costs.

In accordance with the processes of the present invention, stable emulsions are not permitted to form but are prevented by proper chemical control of condensation conditions. This control is effected by adding a suitable chemical compound or compounds prior to or at points of condensation of tar and water from the gas, whereby all the tar condenses in the presence of the chemical which does not permit stable emulsions to form. For example, the chemical may be added to the gas stream prior to condensation or may be contacted with the water which forms the other phase of the emulsion, to the water in or circulated to the wash box, to water or other liquid in or circulated to direct condensers or to water or other liquid in or circulated to scrubbers or washer coolers.

In order to make the process continuous, the chemical compound or compounds used must be continually replenished at the points of condensation to make up for quantities lost from the system, either from mechanical losses or interaction of the added chemical with the other chemical compounds present in the system.

The tar and water mixture from the wash boxes and subsequent condensing equipment flows to separators as in normal plant practice, tar of low water content separating readily from the water, which water is re-used as far as practicable to reduce to a minimum the quantity of additional chemical needed.

In accordance with the first embodiment of the present invention, the condensation of tar is caused to take place in the presence of a calculated quantity of an alkaline wetting agent, the exact amount depending upon several factors including the type and characteristics of the tars being formed and the rate of loss of the alkaline wetting agent employed. Suitable wetting agents comprise ammonia, caustic soda, soda ash and similar materials. The wetting agent may be added to the carburetted water gas stream prior to the condensation of tar, directly or indirectly to the water in or circulated to the wash box, or directly or indirectly to the liquid in or circulated to direct condensers, washer coolers and scrubbers. When the alkaline wetting agent is added to water used for cooling and scrubbing, the pH (hydrogen ion concentration) may be employed as a measure of the quantity present and once the most effective pH for any particular tar or set of conditions is established, this may be followed and maintained with the aid of conventional colorimetric or electrometric pH apparatus.

An illustration of the operation of the process of this first embodiment of the present invention is given in the following example. In a plant producing carburetted water gas using petroleum residual oil as a carburetting agent, extremely stable emulsions of water and tar were being produced, both in the wash box and in the condenser tars, which emulsions were causing considerable trouble in added labor and expense for dehydration and interfering with normal plant operations. An alkaline wetting agent, in this case sodium hydroxide, was added continuously to the water which was circulated to the wash boxes in quantity sufficient to raise the pH range from 4.0–5.5 to 6.5–9.0 and maintain the latter range, thus providing for condensation of wash box tar in the presence of a controlled quantity of chemical. By the normal process of manufacture, particles of the chemically treated water were entrained in the gas stream and carried on to the subsequent condensing equipment, whereby all the tar, including that in the wash box, as well as that obtained in the condensing equipment, condensed in the presence of the chemically treated water of pH range 6.5 to 9.0. It was observed that the water content of the tar condensing in the wash box and other condensing equipment was immediately reduced and furthermore that the residual water in the tar could be separated readily by simply keeping the mixture warm and quiescent for a period of from 12 to 24 hours.

In accordance with a second embodiment of the invention, the condensation of tar is caused to take place in the presence of a controlled quantity of an emulsifying agent tending to form emulsions of the tar-in-water type in which tar is the dispersed phase, the particular agent employed and the quantity used being dependent on a number of factors including the type and characteristics of the tars being formed, the rate of loss of the emulsifying agent employed, and the ability of the emulsifying agent to produce clear separated water rather than a high water content oil-in-water emulsion. Suitable emulsifying agents include the alkali metal and ammonium salts of higher fatty acids or other organic acids, such as sodium oleate, ammonium stearate, ammonium linoleate and rosin soaps. Other substances found to be effective include fatty acid derivatives such as glyceryl monoricinoleate, diglycol laurate and the like and sulphonated animal and vegetable oils, of which sulphonated castor oil is an example. In general, suitable emulsifying agents comprise chemical compounds consisting of a water soluble part and an oil soluble part, as shown by the following examples:

| Chemical | Water soluble part | Oil soluble part |
|---|---|---|
| Sodium oleate | Alkali metal part | Oleic acid radical. |
| Glyceryl monoricinoleate | Free hydrogen group in half-ester. | Oleic acid radical. |
| Sulphonated castor oil | Sulphonic acid group. | Rest of molecule. |

The emulsifying agent is brought to bear at the point of condensation of tar and water in the same manner as outlined in the first embodiment of the invention, the quantity being controlled so as to prevent water-in-tar emulsion formation and also tar-in-water emulsion formation.

In the treatment of some water gas tars, the further discovery has been made that the use of the above mentioned emulsifying agents with the concurrent use of alkaline wetting agents is especially effective in preventing the formation of stable emulsions with the water. The use of the two agents concurrently and in controlled quantities permits the use of pH measurements to follow and maintain the required chemical control of condensation.

While the invention has been described for illustration as including the introduction of the chemical treatment material at certain points, it will be understood that the chemical treatment material may be introduced at any point prior to the condensation of the tar, and that the appended claims are not limited to the point of introduction of the chemical treatment material unless the point is specifically recited therein.

It should be understood that the present invention is not limited to any statement of theory herein contained nor to any specific examples of materials or procedures herein described, except as expressed in the claims appended hereto.

We claim:

1. In the production of carburetted water gas in the usual apparatus, including a wash box, condensers, etc., and using petroleum residual oils for carburetion, the method of preventing the formation of stable emulsions of tar and water which comprises causing the condensation of the tar to occur in the presence of a controlled quantity of an alkaline material sufficient in quantity to maintain the pH value of the water between 6.5 and 9.0 and insufficient to form an emulsion of the tar-in-water type.

2. The method of preventing the formation of emulsions of tar and water during the production of carburetted water gas and like fuel gases by the use of petroleum residual oils, which comprises recirculating the condenser water and maintaining the water in contact with which the tar condenses at a pH value between about 6.5 and 9.0 by the addition during operation of sufficient alkaline material to the circulating water to maintain the said pH value.

3. The method of avoiding the formation of stable emulsions of tar and water during the production of carburetted water gas in the usual apparatus, including a wash box, condensers, etc., and using petroleum residual oils for carburetion which normally tend to form stable water-in-tar emulsions, which comprises continually adding an alkaline material to the aqueous liquid circulated to the wash box, in an amount sufficient to maintain the pH value of the water between 6.5 and 9.0, the quantity of alkaline material added being insufficient to form any emulsion of the tar-in-water.

4. The method of preventing the formation of emulsions of tar and water during the production of carburetted water gas and like fuel gases using petroleum residual oils as the carburetting medium, which comprises causing condensation of tar to occur in the wash box and condenser water in the presence of an alkalizing material and as well an emulsifying agent continuously adding to the water and tending to form emulsions in which tar is the dispersed phase.

5. The method of preventing the formation of emulsions of tar and water during the production of carburetted water gas using petroleum residual oils as the carburetting medium, which comprises continually adding to the wash box and condenser water an alkalizing agent and as well an emulsifying agent tending to form emulsions in which tar is the dispersed phase to maintain the water in contact with which the tar condenses at a pH value of 6.5 to 9.0.

CHARLES A. LUNN.
ARTHUR R. BELYEA.